United States Patent
Bozanic et al.

[11] 3,775,670
[45] Nov. 27, 1973

[54] HIGH BANDWIDTH - TIME PRODUCT SPIN ECHO SYSTEM

[75] Inventors: Donald A. Bozanic; Dickron Mergerian, both of Baltimore; Ronald W. Minarik, Lutherville; Peter H. Pincoffs, West Severna Park, all of Md.

[73] Assignee: Westinghouse Electric Corporation Pittsburgh, Pa.

[22] Filed: Apr. 30, 1970

[21] Appl. No.: 33,201

[52] U.S. Cl. .......................... 324/0.5 R, 340/173 NI
[51] Int. Cl. ............................................ G01n 27/78
[58] Field of Search ...................... 324/0.5 R, 0.5 A; 340/173 NI

[56] References Cited
UNITED STATES PATENTS
3,671,855  6/1972  Bozanic .............................. 324/0.5
3,324,461  6/1967  Kaplan........................... 340/173 NI OTHER PUBLICATIONS
D. A. Bozanic, D. Mergerian and R. W. Minarick–Electron Spin–Echo Measurements of $E_1'$ Centers In Crystalline Quartz–Phys. Rev. Letters–21(8)–8/19/68, pp. 541–542.
H. J. Gerritsen, S. E. Harrison, and H. R. Lewis–Chromium Doped Titania as a Maser Material–Jour. of App. Phys. – 31(9)–9/60–pp. 1566–1571.
D. E. Kaplan – Zero Field ESR Spectra and Relaxation of $Ce^{3+}$ in $CaF_2$ at High Concentrations–Bull. Am. Phys. Soc. – 1963 – pg. 468.

Primary Examiner—Michael J. Lynch
Attorney—F. H. Henson, E. P. Klipfel and J. L. Wiegreffe

[57] ABSTRACT

A system for the generation of a spin-echo signal utilizing a paramagnetic sample of titanium dioxide (rutile) selectively doped with nickel wherein the crystalline electric field of the rutile doped with nickel splits the energy level of the nickel at a predetermined frequency (8.25GHz) and spin-echo signals are produced without the requirement of an external magnetic field.

7 Claims, 2 Drawing Figures

HIGH BANDWIDTH - TIME PRODUCT SPIN ECHO SYSTEM

BACKGROUND OF THE INVENTION

1. Field of the Invention

The subject invention is directed to "spin-echo" systems utilizing a paramagnetic sample located in microwave transmission line means operated at cryogenic temperatures wherein the application of a first and a second RF pulse in the sample gives rise to a spin-echo signal which appears at a time following the second RF pulse corresponding to the time interval between the two RF pulses and more particularly, to a spin-echo system utilizing a sample comprised of titanium dioxide (rutile) doped with iron group transition metal ions.

The spin-echo phenomenon normally exists when a paramagnetic sample is located in a resonant cavity situated between a homogeneous DC magnetic field such that when a first or "input" RF pulse having a frequency equal to the characteristic or "Larmor" frequency of the sample is applied at right angles to the DC magnetic field whereupon a torque is applied to the magnetic moment which causes it to be tipped away from the direction of the magnetic field. The angle of tipping, that is the angle between the moment and the direction of the field is proportional to the magnitude of the field and the time during which the RF pulse exists. Upon release of the displacing force, the spinning electrons urged again towards realignment by the force of the magnetic field rotate or precess about the field in much the same manner as a tipped gyroscope. When a sample is subsequently subjected to another or "recall" RF pulse also directed normal or transverse to the magnetic field, the sample spontaneously develops a magnetic field of its own which is also normal to the magnetic field and which rotates about the latter's direction. The strength of the rotating field builds up to a maximum and then decays which is then detected as an electrical pulse called a "spin-echo" signal.

2. Description of the Prior Art

Pulsed nuclear induction spin-echo systems are well known to those skilled in the art. An example of such a teaching is found in U.S. Pat. No. 2,887,673 issued to E. L. Hahn. Further development in the art resulted in electron spin-echo systems, an example of which is disclosed in U.S. Pat. No. 3,129,410 issued to P. P. Sorokin. The difference between electron and nuclear spin systems is the difference in the operating frequency encountered. This is attributed to the smaller mass of the electron in comparison to the proton in the nucleus. The precessional or Larmor frequencies of electrons therefore lie in the microwave range.

Still a later development has been the recent discovery of a zero-field spin-echo signal reported on Mar. 31, 1968 by D. E. Kaplan in a final report by the Lockheed Research Laboratory on Contract Number No. 2541(00). This publication indicated that an electron spin-echo signal was observed at zero magnetic field utilizing $CaF_2$ doped with 0.1 - 0.5 percent of $Ce^{3+}$. Line widths of 20MHZ having a phase memory time of 1 microsecond were observed.

Additionally, a system for the generation of an "exchange echo" signal similar to a spin-echo signal has been developed comprising a very heavily doped sample of paramagnetic material such as rutile. The rutile sample is doped with iron group transition metal ions producing paramagnetic defect centers in the order of $1 \times 10^{19}$ to $1 \times 10^{21}$ defects centers per $cm^3$ wherein no magnetic field of any kind is necessary for the production of the echo signals and wherein echo bandwidths considerably greater than those generally associated with spin-echoes are achievable. This concept is taught in co-pending U.S. Pat. application Ser. No. 845,406 filed on July 28, 1969, now U.S. Pat. No. 3,671,855, in the names of the inventors of the subject invention and being entitled "Broadband Zero Field Exchange Echo System." The effect produced therein is believed due to a series of lines which appear due to the iron group transition ions which are influenced by other ions located near each other and coupled through exchange interaction.

Where a spin-echo microwave memory system is desired, the bandwidth - time (BT) product also often referred to as the pulsed compression ratio must be comparable with conventional memory devices. The largest bandwidth - time product previously observed in a spin-echo system was 250 which was experimentally observed and reported by Clark Mollenhauer and Owen Lewis of the Syracuse University Research Corporation in *Microwaves*, Volume 8, No. 10, page 12, Oct. 1969. The paramagnetic sample employed was phosphorus doped silicon operating at liquid helium temperatures.

SUMMARY

The present invention has for its object the provision of a very high bandwidth - time (BT) product spinecho system by utilizing nickel doped titanium dioxide (rutile) selectively doped to control the spin lattice relaxation time and phase memory time. When rutile doped with nickel is utilized as a spin-echo sample and operated at a frequency of 8.25GHz, the crystalline electric field of the sample itself splits the energy levels of the nickel without the need for an externally applied DC magnetic field. The subject sample is located in a microwave transmission line operated at cryogenic temperatures. Means are additionally included for coupling a first or "input" and a second or "recall" microwave pulse at a predetermined frequency such as 8.25GHz into the sample whereupon a spin-echo signal is produced at a time substantially equal to the interval occurring between the input and recall pulse.

DESCRIPTION OF THE PREFERRED EMBODIMENT

Figures 1, 2:
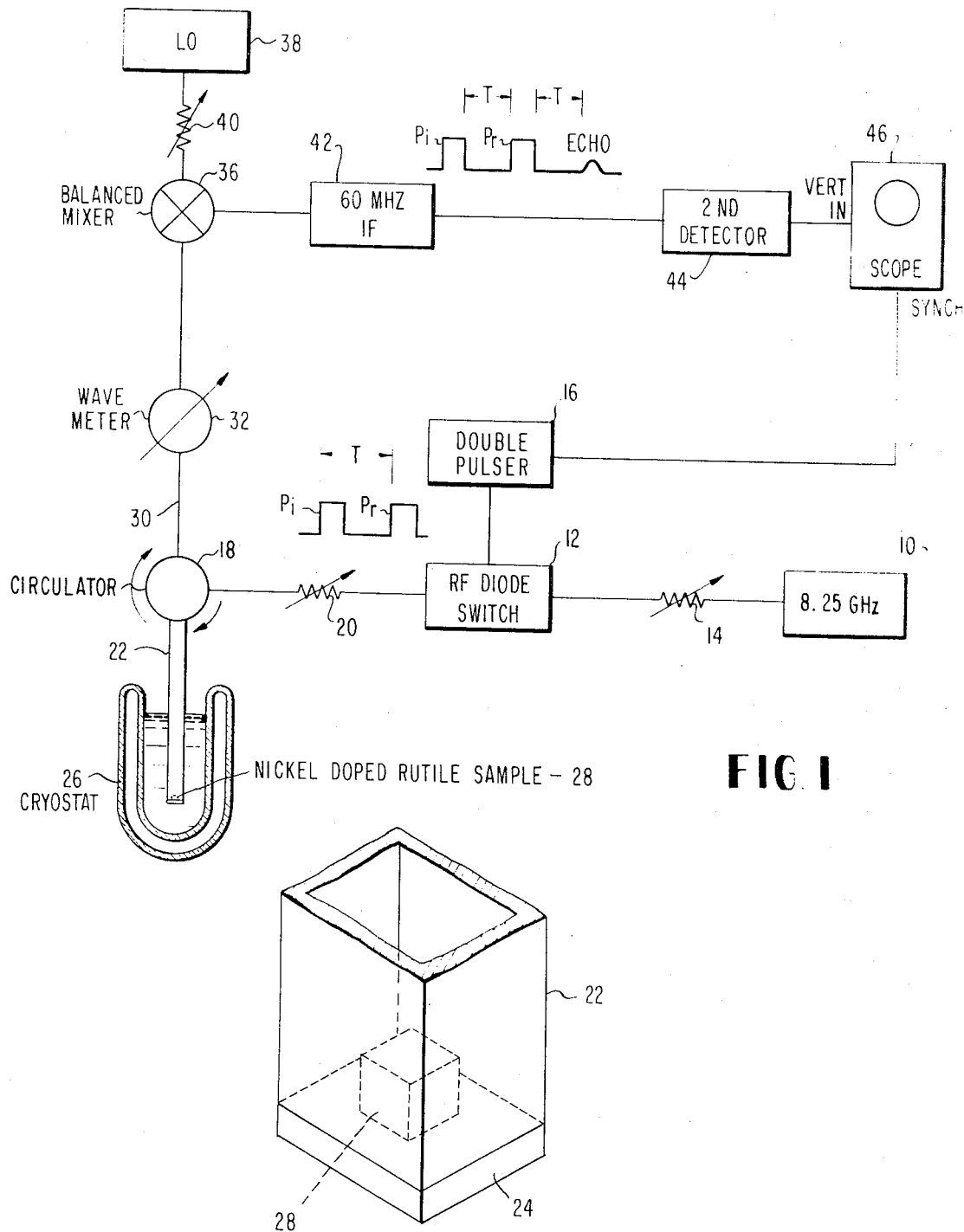
FIG. 1 is a block diagram of a first embodiment of electrical apparatus for practicing the subject invention.
FIG. 2 is a fragmentary perspective view of the microwave transmission line adapted to hold the nickel doped rutile spin-echo sample.

Referring now to the drawings, FIG. 1 discloses, inter alia, a microwave source 10 operable in the X-band range of microwave frequencies and preferably but not exclusively at 8.25GHz. The microwave source 10 is coupled to a controlled RF diode switch 12 by means of a first microwave signal waveguide path including the level set attenuator 14. The RF diode switch 12 is controlled by a double pulser electronic circuit 16 which is operable to produce a pair of gate signals separated by a predetermined time interval T for producing an output of the diode switch 12 which comprises a pair of microwave pulses corresponding to the "input"

pulse $P_i$ and the "recall" pulse $P_r$ of a spinecho system. The pulses $P_i$ and $P_r$ are coupled to a circulator 18 by means of a second waveguide path including a second level set attenuator 20 whereupon the microwave pulses $P_i$ and $P_r$ are transferred to a microwave transmission line means comprising a waveguide section 22. The waveguide section 22 is terminated in a waveguide load comprising a short 24 and is immersed in a cryostat 26 which contains a cryogenic material such as liquid helium for operation at extremely low temperatures (4°K and below, e.g., 1.2°K).

The waveguide section 22 at the termination 24 contains a spin-echo sample 28 comprised of paramagnetic material having the following properties: (a) the host material contains no nearest-neighbor elements to the echo-producing paramagnetic defect which possess nuclear spins; (b) the resonance transition of the paramagnetic defect permits zero magnetic field operation at some microwave operating frequency which permits relatively high BT products to be achieved; (c) the phase memory time can be controlled by the doping concentration; and (d) the material exhibits a spin-lattice relaxation time comparable to the memory cycle repetition period obtained in conventional memory systems.

Based on these considerations, a sample of titanium dioxide or rutile doped with "non-Kramers" ions such as nickel ions ($Ni^{++}$) is utilized as the spin-echo sample 28. Various doping levels can be selectively obtained by completely immersing the rutile host lattice in a nickel oxide (NiO) powder and heating it to 1,100° C in air for various lengths of time. The nickel ion which is in the atomic state "2+" is employed as the echo-producing defect. The nearest atomic neighbors to this ion which are oxygen ions, however, contain no nuclear spins. Secondly, the crystalline electric field of the rutile doped with nickel splits the energy levels of the nickel at an operating frequency of 8.25GHz producing what is referred to as "zero field splitting" of the spins eliminating the need for an external magnetic biasing field. When the pulses $P_i$ and $P_r$ are coupled to the nickel doped sample 28 which is at a temperature below 4°K and more particularly at 1.2°K which can be obtained by suitable modification of the cryostat 26, a "spin-echo" signal is produced which is coupled back along the waveguide 22 through the circulator 18 and to an output microwave transmission line 30 including a wave meter 32. The spin-echo signal is applied to the balanced mixer 36 which receives a local oscillator signal from the oscillator 38 by means of the waveguide path including the variable attenuator 40. The output of the mixer 36 comprises an IF signal of the two microwave pulses $P_i$ and $P_r$ used to generate the "spin-echo" signal in addition to the "echo" signal itself. This IF signal is coupled to an IF amplifier 42 where it is then fed into a second detector 44 which produces a video signal output of the pulses concerned which are then viewed on a suitable indicator 46 which may be, for example, an oscilloscope.

The following experimental results were obtained for different typical rutile samples having various doping levels as obtained by varying the doping time with NiO powder and when the samples were operated at 1.2°Kelvin and at the zero field operating frequency of 8.25GHz:

| Sample | Doping Time | Electron Paramagnetic Resonance | Phase Memory Time |
|---|---|---|---|
| 1 | 10 Minutes | ≈150MHz | 800μsec. |
| 2 | 70 Minutes | ≈150MHz | 600 μsec. |
| 3 | 3 Days | <2.0GHz | 110 μsec. |
| 4 | 4 Days | <2.0GHz | 80 μsec. |

TABLE I

It becomes evident that the phase memory time is dependent upon the doping concentration and can be increased by selectively lowering the doping concentration; however, it may be desirable in some cases to raise the doping concentration in order to increase the paramagnetic bandwidth by creating "exchange" lines such as taught in co-pending U.S. Ser. No. 845,406 referenced above. Although the phase memory time decreases for increased doping concentrations the increase in bandwidths may be in higher proportion so as to yield a higher overall BT product.

Additionally, the spin-lattice relaxation time is in the order of 10 M sec. at 1.2°Kelvin and therefore permits operation with a 100Hz PRF. This can be increased continuously by raising the temperature so that for example a 20KHz PRF can be obtained at 4.2°K. Normally, the value of the spin-lattice relaxation time at 1.2°Kelvin for most other spin-echo materials is in the order of seconds and as a result does not permit a useable PRF. However by utilizing nickel doped rutile a material is selected which possesses a "non-Kramers" ion wherein an even number of electrons appear in the outer shell so that there are no unpaired spins and it is a characteristic of these ions that they have a much faster spin-lattice relaxation rate in a zero field which occurs at 8.25GHz for nickel doped rutile.

By employing suitably nickel oxide doped titanium dioxide a BT product of 20,000 can be obtained for a fundamental resonance line mode (8.25GHz) when samples 1 and 2 are utilized but a BT product of 200,000 can be obtained in an "exchange" line mode such as would be the case when samples 3 and 4 are utilized. Still significant, however, is the fact that the doping with a "non-Kramer's" ion permits a useable PRF. In addition the spin-echo material is easily produced by simply diffusing NiO into $TiO_2$. A relatively low insertion loss, e.g., approximately 24db can be obtained at 1.2°K in zero magnetic field and because of its high dielectric constant possesses such excellent coupling to the microwave signals $P_i$ and $P_r$ that it need only be inserted in a section of the waveguide.

Having thus described by wave example what is considered at present to be the preferred embodiment of the subject invention,

We claim as our invention:

1. A spin-echo system comprising in combination:

means for generating at least first and second RF microwave pulses separated by a predetermined time interval;

waveguide transmission line means coupled to said first and said second RF microwave pulse;

a spin-echo sample positioned in a substantially zero steady state magnetic field, comprising a rutile sample selectively doped with nickel ions with the doping level being selected to give the desired bandwidth and phase memory time, said sample being located in said waveguide transmission line means, and being responsive to said first and said second microwave pulse to produce a spin-echo signal; and means surrounding said spin-echo sample for reducing the temperature of said sample to a predetermined cryogenic temperature.

2. The invention as defined by claim 1 wherein said cryogenic temperature is substantially in the region of from 1.2°K to 4.2°K.

3. The invention as defined by claim 2 and wherein said microwave transmission line means comprises a section of waveguide terminated in a load and including means for locating said spin-echo sample therein.

4. The method of increasing the dynamic range and repetition rate of a spin-echo signal comprising the steps of:

positioning a rutile spin-echo sample doped with nickel ions, the concentration of said nickel ions being selected to give the desired bandwidth and phase memory time within a microwave transmission line, said sample being subjected to substantially zero steady state magnetic field;

lowering the temperature of said spin-echo sample to a predetermined cryogenic temperature; and applying a first and a second pulse of RF energy to said spin-echo sample in a predetermined timed relationship to produce a spin-echo signal.

5. The method as defined by claim 4 wherein said sample is doped by immersing said sample in a nickel oxide powder and heating it to 1100°C in air for a predetermined length of time, said time determining the doping concentration.

6. The method as defined by claim 5 wherein said step of applying a first and a second pulse of RF energy comprises applying a first and a second pulse of RF energy at an operating frequency in the region of and including 8.25GHz.

7. The method as defined by claim 6 wherein said predetermined cryogenic temperatures is in the range including 1.2°Kelvin and 4.2°Kelvin.

* * * * *